C. H. GATCHELL.
Chucking and Centering Devices for Metal Turning-Lathes.

No. 150,469. Patented May 5, 1874.

UNITED STATES PATENT OFFICE.

CHARLES H. GATCHELL, OF OLDTOWN, MAINE.

IMPROVEMENT IN CHUCKING AND CENTERING DEVICES FOR METAL-TURNING LATHES.

Specification forming part of Letters Patent No. 150,469, dated May 5, 1874; application filed April 10, 1874.

*To all whom it may concern:*

Be it known that I, CHARLES H. GATCHELL, of Oldtown, in the county of Penobscot and State of Maine, have invented certain new and useful Improvements in Combined Lathe and Centering-Machines; and I do hereby declare that the following is a full, clear, and exact description thereof, that will enable others skilled in the art to which it appertains to make and use the same, reference being had to the accompanying drawings, and to the letters of reference marked thereon, which form a part of this specification, in which—

Figure 1:
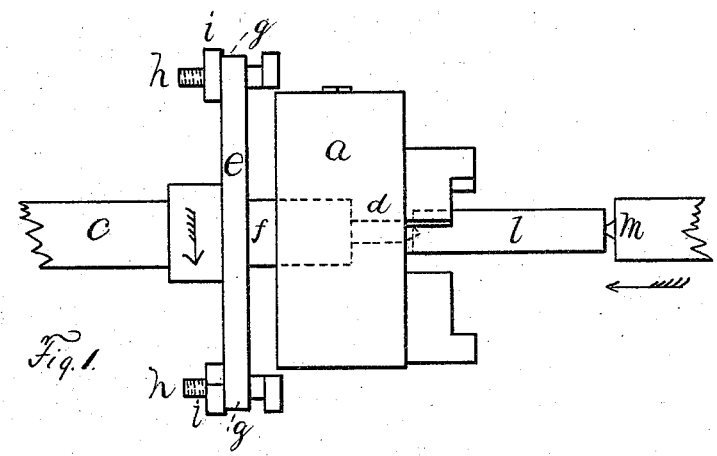
Figure 2:
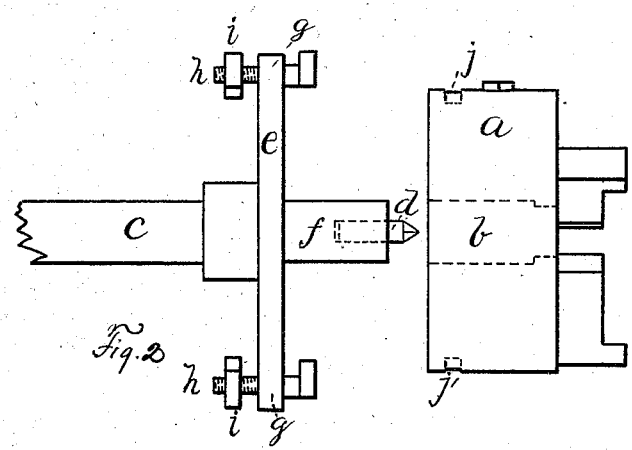

Figure 1 shows a view of a universal chuck and of a lathe-spindle with drill; Fig. 2, the same when united for use as a centering-machine.

Same letters show like parts.

The object of my invention is to enable the ordinary lathe, provided with a universal chuck, to be used as a centering-machine as well as for its original purpose.

I effect my object by providing the lathe-spindle with a drill of proper size, and by so modifying the attachment of the universal chuck thereto as to enable said spindle and drill to revolve independently of said chuck when used for centering. The chuck in such case does not revolve, but is fed up to the drill together with the article to be centered.

Most, if not all, of the universal chucks in common use may be used with my device upon the ordinary lathes with effect. I will, therefore, confine myself to the description of the peculiar features of my invention.

Referring to the drawing, $a$ shows a lathe-chuck, as above described, provided with the usual cavity $b$ through its center. At $c$ is shown the lathe-spindle, upon which the chuck is commonly secured, provided with a drill, $d$, which may be removed at will when not required for use. I do not regard it of consequence whether said drill is inserted directly in the end of the spindle, or in a plate or cylinder attached thereto. In the drawing, a convenient method of effecting my purpose, as hereinbefore described, is shown. This device, as shown, consists of a plate, $e$, attached to the lathe-spindle $c$, and revolving with it, and having upon its opposite side a cylindrical projection, $f$, bored to receive the drill $d$, and of a size to fit the cavity $b$ in the chuck. This plate $e$ is somewhat larger than the circumference of the chuck, and is provided with holes $g$ near its edge, through which pass bolts $h$, secured by nuts $i$, as shown. These bolts $h$ have "blind-sided" heads, and the chuck $a$ is provided with cavities $j$, into which the projecting portion of the bolt-heads may be turned. Then, by tightening up the nuts $i$, the chuck is drawn up, and held tightly to the plate $e$ and attached spindle, and, revolving with it, may be used as an ordinary chuck.

When it is desired to use the lathe as a centering-machine, the nuts $i$ are loosened and the bolt-heads turned out of the cavities $j$, leaving the blind side of the heads turned toward the chuck. This disconnects it from the plate and spindle, allowing them to revolve independently. The chuck is then blocked so that it cannot revolve, and the article, $l$, to be centered secured between its jaws and the tail-center of the lathe $m$. The chuck is then slipped a short distance from the plate $e$, the cylindrical projection $f$ still remaining in the cavity $b$. The drill $d$ is in place, as shown in dotted lines, Fig. 2. Power being applied to the spindle, the drill operates upon the article to be centered, which, together with the chuck, is fed up as required by the feed mechanism.

I do not claim any particular form of lathe or chuck, nor do I limit myself in this particular; neither do I limit myself to any particular devices for attaching or detaching the chuck and spindle; but, Having shown one method in which my principle may be applied, what I claim, and desire to secure by Letters Patent, is—

In a lathe, the within-described combination of a drill-carrying spindle with a universal chuck thereon, whereby said spindle may be made to revolve independently of said chuck, substantially as and for the purposes set forth.

In testimony that I claim the foregoing I have hereunto set my hand this 7th day of April, 1874.

CHAS. H. GATCHELL.

Witnesses:
WM. FRANKLIN SEAVEY,
W. E. BROWN.